(12) United States Patent
Sollo

(10) Patent No.: US 6,702,140 B1
(45) Date of Patent: Mar. 9, 2004

(54) PROCESS FOR THE MANUFACTURE OF COOKING VESSELS AND VESSELS OBTAINED ACCORDING TO SUCH PROCESS

(75) Inventor: Giovanni Sollo, Naples (IT)

(73) Assignee: Societa Italiana Pentole-SIP S.p.A., Naples (IT)

( * ) Notice: Subject to any disclaimer, the term of this patent is extended or adjusted under 35 U.S.C. 154(b) by 0 days.

(21) Appl. No.: 10/009,144

(22) PCT Filed: May 2, 2000

(86) PCT No.: PCT/EP00/03930

§ 371 (c)(1),
(2), (4) Date: Jun. 28, 2002

(87) PCT Pub. No.: WO00/66316

PCT Pub. Date: Nov. 9, 2000

(30) Foreign Application Priority Data

May 4, 1999 (EP) .............................................. 99830267

(51) Int. Cl.⁷ .......................... A47J 36/00; B23P 11/00
(52) U.S. Cl. ................. 220/573.3; 220/573.1; 403/279; 403/280; 403/285; 219/621; 29/521
(58) Field of Search .......................... 220/573.1, 573.3; 29/437, 514, 520, 521, 524, 432, 432.1, 432.2, DIG. 11, 904; 428/615; 72/363, 378; 403/279, 280, 281, 282, 283, 284, 285; 219/621, 624

(56) References Cited

U.S. PATENT DOCUMENTS

| | | | | |
|---|---|---|---|---|
| 1,997,987 A | * | 4/1935 | Victor, Jr. | |
| 2,888,742 A | * | 6/1959 | Stumbock | |
| 3,199,188 A | * | 8/1965 | Ottinge | |
| 4,533,807 A | * | 8/1985 | Minamida | |
| 4,544,818 A | * | 10/1985 | Minamida | |
| 4,723,783 A | * | 2/1988 | Belter et al. | |
| 5,172,920 A | * | 12/1992 | Schlenk | |
| 5,345,667 A | * | 9/1994 | Coppier | |
| 5,430,928 A | * | 7/1995 | Flammang | |
| 5,497,696 A | * | 3/1996 | Coudurier et al. | |
| 5,564,590 A | * | 10/1996 | Kim | |
| 5,694,674 A | * | 12/1997 | Flammang | |
| 5,788,247 A | * | 8/1998 | Tensor | |
| 6,061,892 A | * | 5/2000 | Kassi | |

FOREIGN PATENT DOCUMENTS

| | | | |
|---|---|---|---|
| EP | 0 509 860 | * | 10/1992 |
| EP | 604617 | * | 7/1994 |
| EP | 0 668 040 | * | 8/1995 |
| FR | 2741553 | * | 5/1997 |
| GB | 505955 | * | 5/1939 |
| GB | 1515951 | * | 6/1978 |
| JP | 10-127491 | * | 5/1998 |
| JP | 10-179383 | * | 7/1998 |
| JP | 2002-178071 | * | 12/2000 |

OTHER PUBLICATIONS

Mechanical Engineer's Handbook, John Wiley & Sons, 1986, pp. 142–143.*
FR 2,741,553 English Abstract. Derwent.*

* cited by examiner

Primary Examiner—Gregory Vidovich
Assistant Examiner—Eric Compton
(74) Attorney, Agent, or Firm—Leffert Jay & Polglaze, P.A.

(57) ABSTRACT

A process for the manufacture of cooking vessels, in particular pots and/or pans in a relatively soft metallic material, with a plate in a metallic material of high hardness applied to the bottom of the vessel, performs a stable connection among said parts with no mechanical and/or thermal trauma for the materials and comprises the steps of: providing a plate (1) provided with a plurality of points (6) projecting from a surface (4) thereof; inducing, by compression, the penetration of said points (6) and the adhering of said surface (4) at the bottom (20); and stretching said bottom (20), thereby causing the deformation and the clutching of said points (6).

41 Claims, 7 Drawing Sheets

US 6,702,140 B1

PROCESS FOR THE MANUFACTURE OF COOKING VESSELS AND VESSELS OBTAINED ACCORDING TO SUCH PROCESS

BACKGROUND OF THE INVENTION

The present invention relates to a process for the manufacture of cooking vessels, in particular pots and/or pans and the like provided with a bottom reinforced with a plate member made of a hard material associated thereto, and also a vessel as above defined, obtained according to such process.

In particular, said process refers to cooking vessels shaped starting from a relatively soft metallic flat member, e.g. made of aluminium, and comprising a bottom portion reinforced with said plate member which is formed in a metallic material of relatively high hardness, e.g., steel-based, possibly having properties making it heatable with a magnetically induced current.

The processes and the related vessels of the above specified type are known in the art. For instance, the French Patent Application No. 91/03695 and the European Patent No. 0,604,617, in the name of SEB S.A., describe a step in which the plate member and the flat member are reciprocally connected with a hot press-stamping.

In this step, the soft material of the flat member is heated and softened. Then, the plate member, that is provided with holes and/or fissures, is press-stamped, e.g. with a hammer or the like, in such a way that the steel plate member is embedded into the aluminium flat member while the latter, due to the induced pressure, penetrates inside said holes.

Such process is disadvantageous due to several reasons, among which the necessity of a step of heating the aluminium, with the entailed consumption of energy and time, and the need to protect the aluminium itself from oxidation processes.

In the European Patent No 0.509.860, a method is described for embedding a holed steel plate in an aluminium layer apt to be manufactured in order to obtain a cooking vessel. According to such method, the embedding is carried out with an energetic step of cold press-stamping, in which the malleability of the aluminium is exploited that is forced to penetrate inside the holes and the fissures of the plate.

Such step, preceding the drawing of the aluminium layer, is a remarkable trauma for the materials and requires the use of high pressures for the cold press-stamping.

In the Swiss Patent No. 227,769 a further method is described for coupling, wherein a spiral-shaped reinforcing member is irreversibly forced inside a groove, of similar shape, formed on a face of the flat member in a soft material.

This method, besides entailing an additional step of hot-or cold forming of said groove, does not allow an application of a real plate member.

In the Italian Patent Application No. RM91A000355 a further method is described, according to which a metallic plate of ferritic steel is fixed to the bottom of a pot by forcing and crimping the edge of the plate inside a peripheral groove surrounding the bottom of the pot already shaped.

This method, although performing an effective coupling without overly traumatising the material, does not provide a suitable reinforcement.

BRIEF SUMMARY OF INVENTION

The technical problem underlying the present invention is that of providing a process for the manufacture of cooking vessels allowing to overcome the drawbacks mentioned with reference to the prior art.

Such problem is solved by a process as above specified, characterised in that it comprises the following steps:
providing a plate member in a metallic material of relatively high hardness, provided with a plurality of points projecting from a surface thereof;
inducing, by compression of the plate member onto the flat member, the penetration of said points in the thickness of the flat member and the adhering of said surface of said plate member on a portion of the flat member at the bottom of the cooking vessel; and
stretching said flat member at least at said portion, causing the deformation and the clutching of said points inside said thickness.

The present invention further relates to a cooking vessel obtained according to the process as above defined, further comprising application steps of one or more non-stick layers, as well as finishing steps of the vessel.

The main advantage of the process for the manufacture according to the present invention lies in allowing an effective securing of the plate member without traumatising the materials and with no further specific steps required.

In fact, the manufacture of the cooking vessels can follow a normal manufacture process, comprising press-stamping and coining steps needed to securing the plate member, while the latter step can be carried out in parallel, yet in a substantially autonomous way.

Moreover, with the above described process it is possible to secure a plate member regardless of the latter extension with respect to those of the bottom portion at issue.

BRIEF DESCRIPTION OF THE DRAWINGS

The present invention will be hereinafter disclosed according to a preferred embodiment thereof, given by way of example and not for limitative purposes. Reference will be made to the annexed drawings, wherein.

DETAILED DESCRIPTION OF THE INVENTION

The process according to the present embodiment relates to the shaping of a pot or of a pan, provided with a reinforced bottom and non-stick surfaces.

Figure 1:
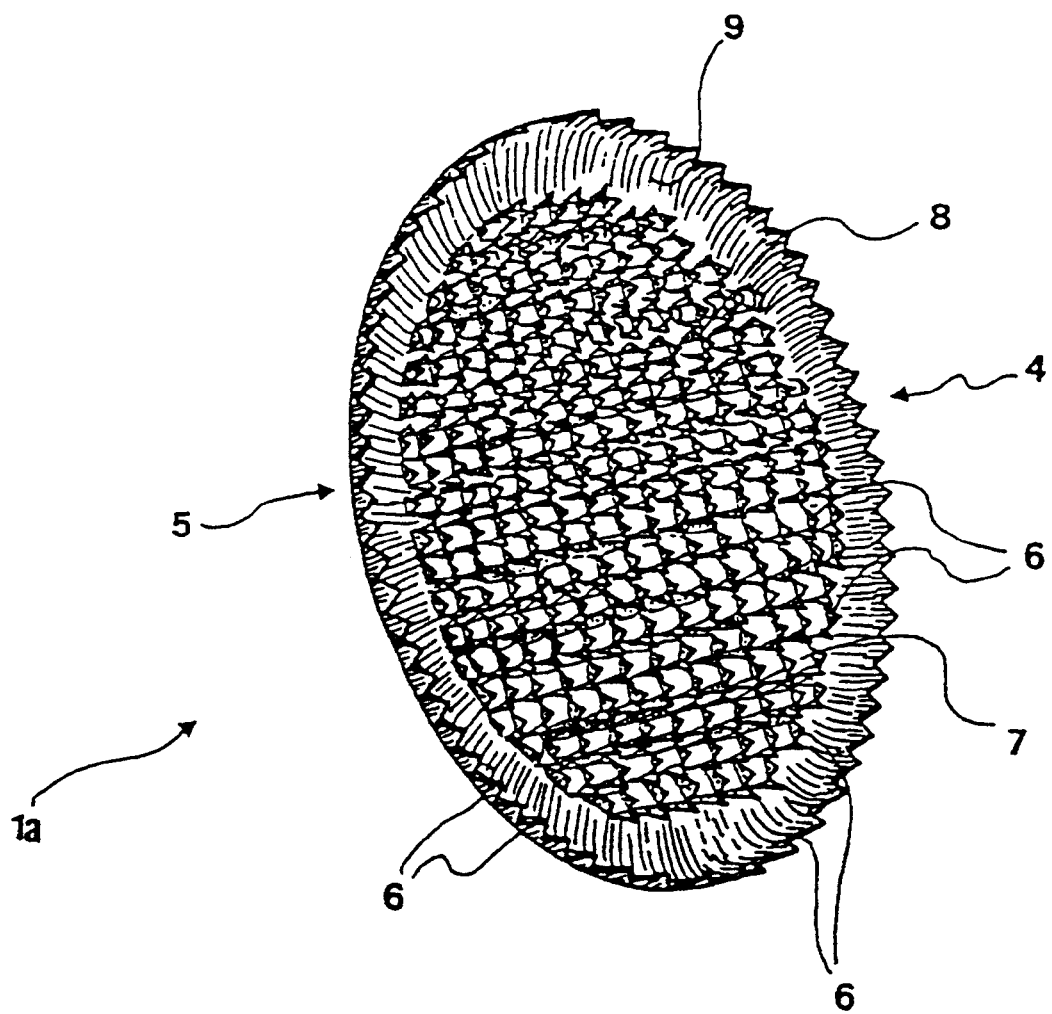
FIGS. 1 to 3 show perspective views of different plate members that can be used in the process for the manufacture according to the present invention.
Figure 2:
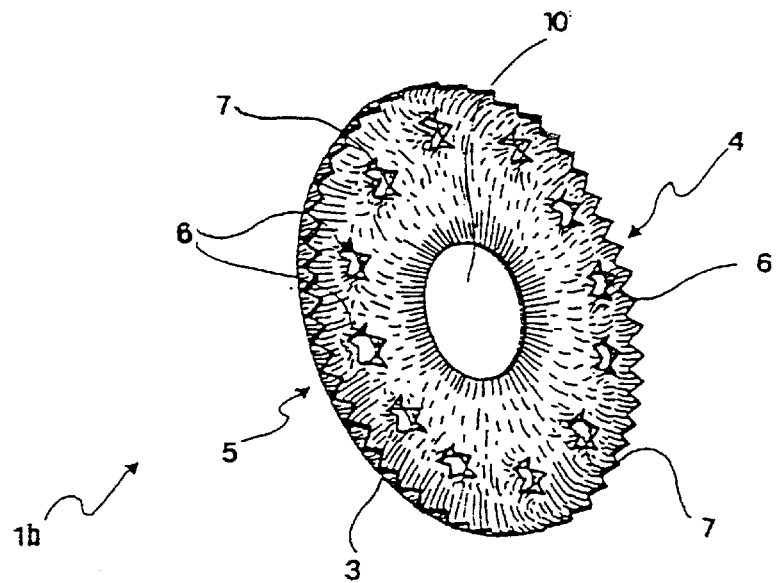
Figure 3:
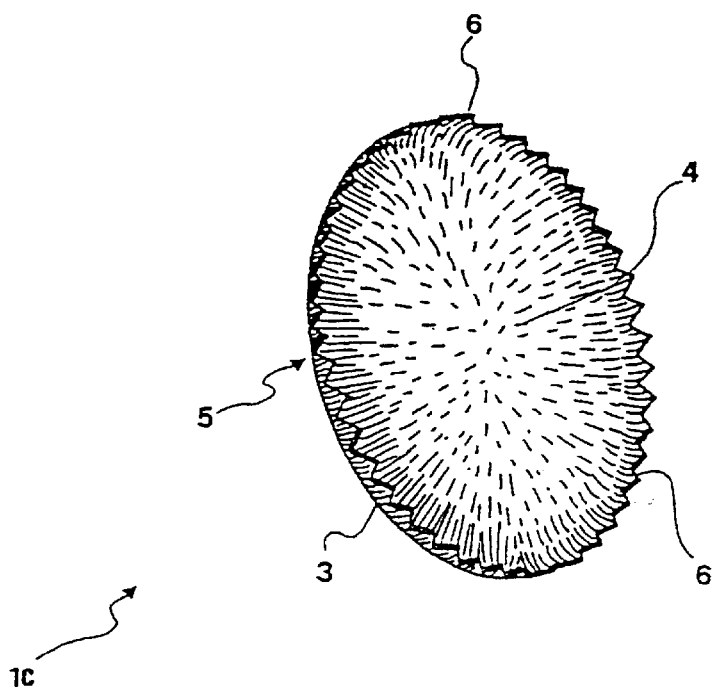

With reference to FIGS. 1 to 3, three embodiments of a plate member, that hereinafter is generally indicated with 1, in FIGS. 4 to 11 are shown, apt to be used in the process disclosed here. Hereinafter, the same numerical references indicate parts performing a similar function in the various embodiments.

The plate members 1 of FIGS. 1 to 3 are in a metallic material of a relatively high hardness, being apt to be applied in the field of the cooking vessels, like pots or pans, manufactured in a relatively soft metallic material and starting from a flat member, indicated with 2 in the next figures, manufactured just in said relatively soft metallic material.

With reference to said materials, said relatively soft metallic material is exemplified without limitative purposes by the aluminium, that is conventionally used in the manufacture of said vessels, or by an alloy substantially based on said metal. The relatively soft metallic material used in the embodiments of the process disclosed hereinafter is aluminium.

Concerning instead the metallic material of a relatively high hardness, it has to have a hardness such as to be capable of deforming said relatively soft metallic material.

An example of a metallic material of relatively high hardness apt to be used in the process according to the invention is stainless steel, that, not requiring coatings, is capable to resist to the typical corrosion phenomena to which the cooking vessels are subjected in their working life.

In particular, in order to obtain a cooking vessel apt to be heated with magnetic induction, a metallic material of relatively high hardness provided with adequate magnetic properties is preferred. Advantageously, a type of metallic material of relatively high hardness that is used in the embodiments disclosed hereinafter is ferritic stainless steel, shortly called ferritic steel.

By way of further example, ferritic steels suitable to these objects are steels having a carbon content preferably lower than 0.15% and a chromium content higher than 15%, as AISI 405, AISI 430, AISI 434.

The plate member 1 is substantially disc-shaped and comprises a circular edge 3, a first surface 4 apt to be adhered to said flat member 2, and a second surface 5, apt to be exposed to the outside.

Said plate member 1 is provided with a plurality of points 6 integrally formed with the plate member 1 and projecting, in a substantially vertical way, from said first surface 4.

Generally, the points 4 are annularly placed at the edge 3 and in case are also formed starting from the solid metallic layer of the plate member 1.

In the first case, the points 6 are performed e.g., by shearing and bending, preferably with a continuous and uninterrupted distribution on said edge 3.

In the second case, the points 6 are formed by punching, carried out using a punch having a drift-pin and flat side faces jointed by sharp edges. Thus, the drift-pin of the punch penetrates into the metallic layer while the sharp edges cut the edges of the points and the faces bend upright the points thus formed.

The number of points 6 formed by each drift-pin depends on the number of side faces of the drift-pin. To each drift-pin further corresponds a hole 7, at which points 6 are formed in said number.

Advantageously, a squared-section drift-pin performs four points 6 per each hole 7, each point 6 having an apex with a spread of approximately 90°.

In any case, each point 6 has an apex with a spread-angle comprised in the range 75°–105°, in order to ensure an effective penetration capability and a section offering a suitable resistance to the axial stress.

With reference to FIG. 1, a first plate member 1a comprises an circle of points 6 projecting from the edge 3 and a plurality of holes 7, each having respective points 6, grouped together in a central portion 8 of the plate member 1a. Said first plate member 1a comprises a full circle 9 delimited by the edge 3 and contouring the holes 7 and the respective points 6.

With reference to FIG. 2, a second plate member 1b is annularly formed having a central circle-shaped opening 10.

The second plate member 1b comprises an circle of points 6 projecting from the edge 3, and a plurality of holes 7, each having respective points 6, evenly spaced along an intermediate circle between the edge 3 and the opening 10.

With reference to FIG. 3, a third plate member 1c is formed in a full-disc shape and comprises a circle of points 6, projecting from the edge 3, and a full portion of the body of the disc.

With reference to FIGS. 4 to 11, hereinafter the process for the manufacture according to the invention will be disclosed.

The process comprises an initial step in the manufacture sequence, consisting in providing of said flat member 2 of a metallic material. In the present preferred embodiment, said flat member is a disc of predetermined thickness, apt to be transformed through the subsequent steps in a cylindrical cooking vessel having a circular section.

Obviously, starting from a member of a different shape, a vessel having a different shape can be obtained, e.g. one having an ellipsoidal section starting from an ellipsoid or a prismatic saucepan starting from a substantially quadrilateral member.

Said aluminium disk, that forms the flat member 2 in the following and is likewise indicated with 2 in the figures, undergoes a first step of superficial polishing treatment, with the removal of a possible oxidised layer.

Such surface treatment can be carried out with any superficial removal method such as pickling, grinding, pumicing, sandblasting and the like.

The preferred treatment is pickling, since, as it can be observed with a microscope, the aluminium surface finishing after the pickling has a plurality of pores comprising surface opening having a narrowed section and a widened hole.

Such pore structure is particularly suitable to receive a coating layer, e.g. of polymeric type.

On the disc 1, a first surface 11 is evidenced, apt to form the outer surface of the vessel that is being manufactured, and a second surface 12, apt to form the inner surface of the vessel that is being manufactured.

The process according to the invention comprises a first step of depositing one or more outer coating layers 13 on said first surface 11.

The application of the outer coating layer 13 can be carried out according to one of the known methods: with a spray or a roller, or also through a silk-screen printing stencil, passing a sleeker to form specific patterns on the first surface.

Figure 4:
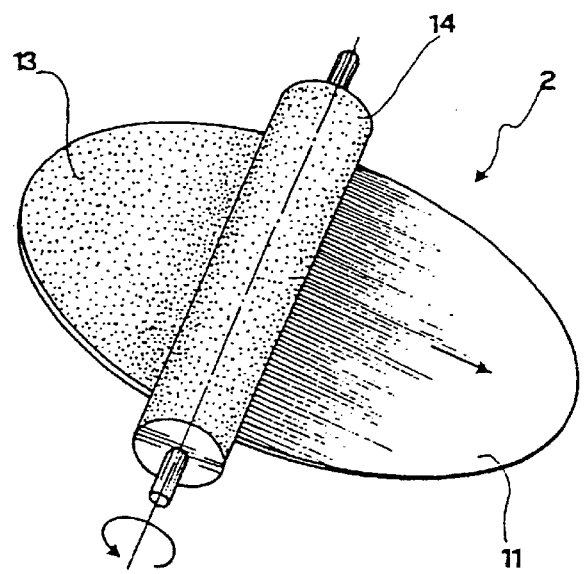
FIGS. 4 to 7 schematically show some steps of the process for the manufacture according to the present invention.

In a preferred embodiment of the present process, the application of the outer coating layer 13 takes place by means of a roller, indicated with 14 in FIG. 4, exerting a predetermined application pressure on the first surface 11.

Such application method allows the forming of one or more outer coating layers 13 having a predetermined and controlled thickness, with the penetration of the innermost layer in said pores of the aluminium.

In a preferred embodiment of the present process, the outer coating layer 13 consists of non-stick polymeric substances, possibly mixed with pigments conferring to said first surface a particular colouring.

The preferred polymeric substance is a PTFE, in a dry weight percentage comprised between 30 and 75%.

The total applied thickness of the outer layer or layers 13 is comprised in the range 5–50 $\mu$m, preferably in the range 20–40 $\mu$m.

The outer layer or layers 13 applied to the disc 1 are then fixed by heating, entailing a polymerisation of the basic material and a stabilisation of the pigment.

Preferably, such heating is carried out by baking, at a temperature conveniently higher than 380° C. in order to obtain an adequate polymerisation, and lower than 480° C.

The preferred baking temperature interval range is 390–450° C.

In any case, the heating time is limited to a few minutes, and is anyhow shorter than 10 minutes.

The process for the manufacture according to the present invention comprises a step wherein a plate member 1 is provided as aforedescribed with reference to FIGS. 1 to 3.

After the first step of depositing, the process according to the present embodiment comprises a step wherein the penetration of said points into the thickness of the flat member, i.e., of the aluminium disc 1, is induced by compression.

Said compression step, can take place e.g., by press-stamping (FIG. 5) of the plate member 1 on said first surface 11 of the disc 2.

After the compression, the adhering of said first surface 4 of the plate member 1 on the said first surface 11 is also induced, in particular on a portion of the disc 2 at the bottom of the cooking vessel that is being manufactured and that is generally indicated with 20.

To this end, the diameter of the plate member 1 is smaller or almost equal to that of said bottom portion 20.

To avoid a deformation and a loss of planarity of the disc 2, due to the internal stresses induced by the press-stamping strain and the penetration of the points 6, said compression can take place concurrently to the action of a pressure bar member.

Figure 5:
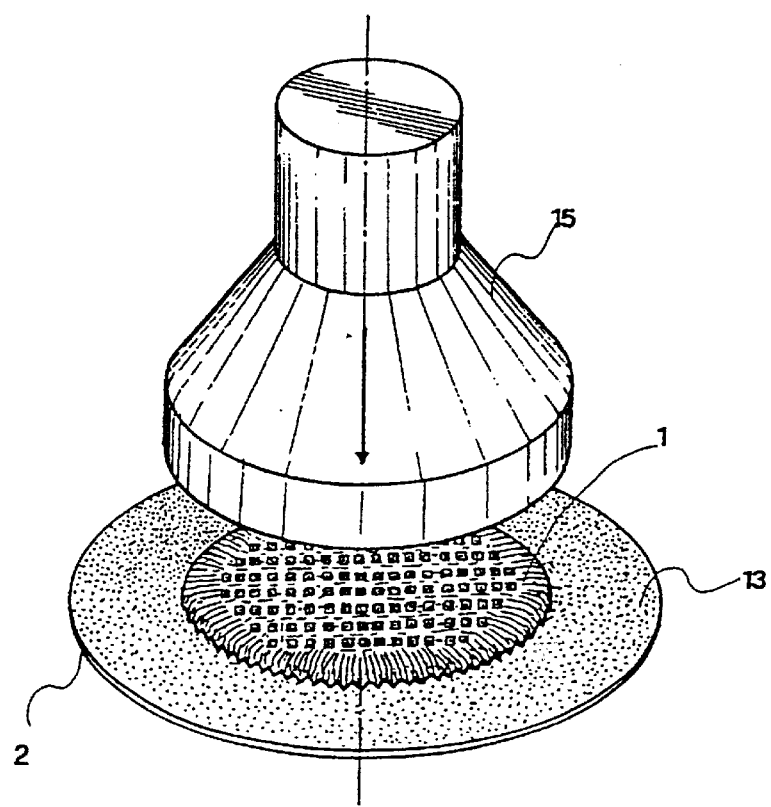

For instance, such pressure bar member can comprise an annular pressure plate contouring the periphery of the coining member, indicated with 15 in FIG. 5. Such plate is connected to the coining member 15 by elastic members, e.g. helical springs, that are apt to be compressed according to a run equal to the coining depth, thereby partially absorbing the pressure exerted thereon.

Advantageously, the action of the pressure bar member entails the exertion of a pressure lower than 50% of the overall pressure exerted by the coining member 15, preferably equal to about 20%.

Thus, the pressure of the pressure bar member is exerted on a region annularly contouring said bottom portion 20.

The press-stamping, performed on an even surface plate and in particular with the action of the pressure bar member, is a limited trauma for the disc 2.

Figure 8:
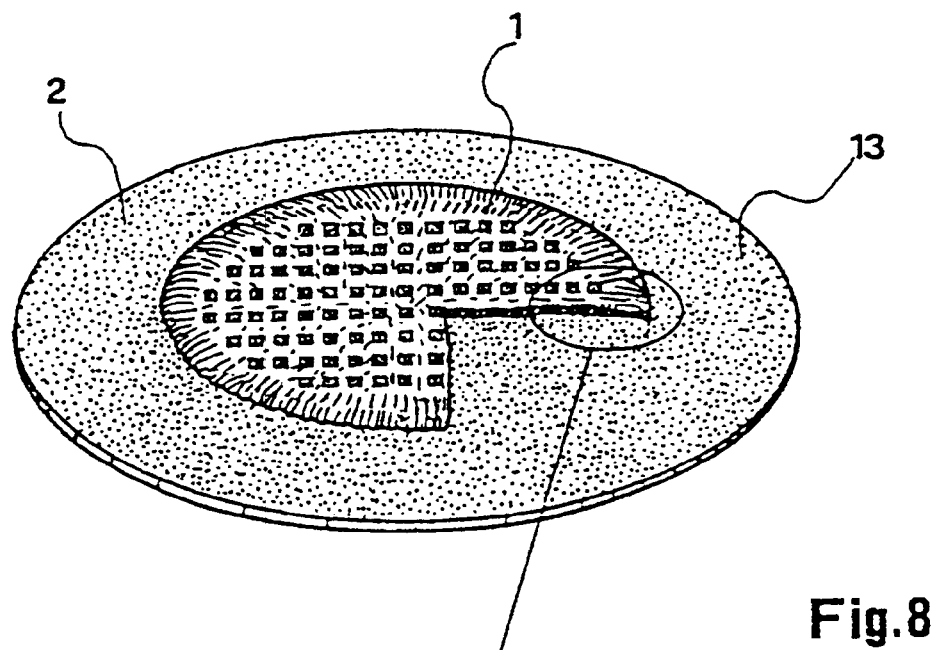
FIG. 8 shows a first semimanufactured vessel of an intermediate step of the process of the preceding figures.
Figure 9:
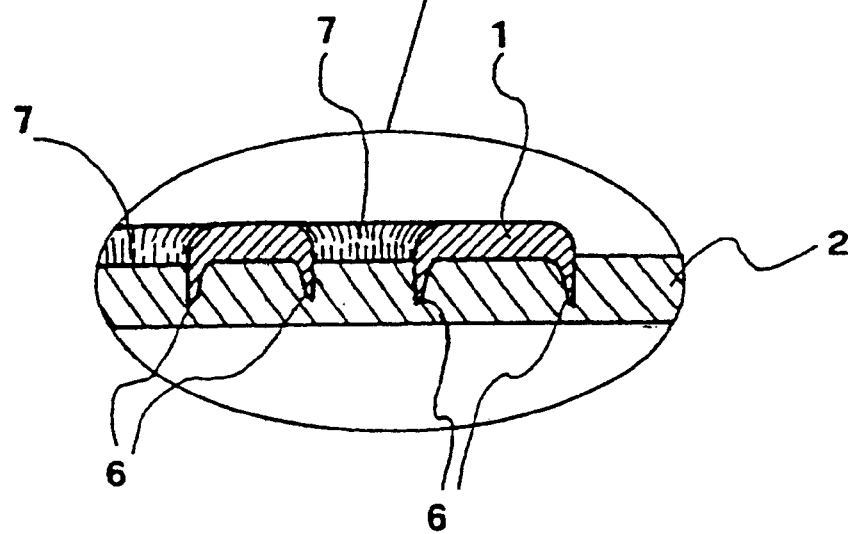
FIG. 9 shows an enlarged section of a detail of said first semimanufactured vessel.
Figure 10:
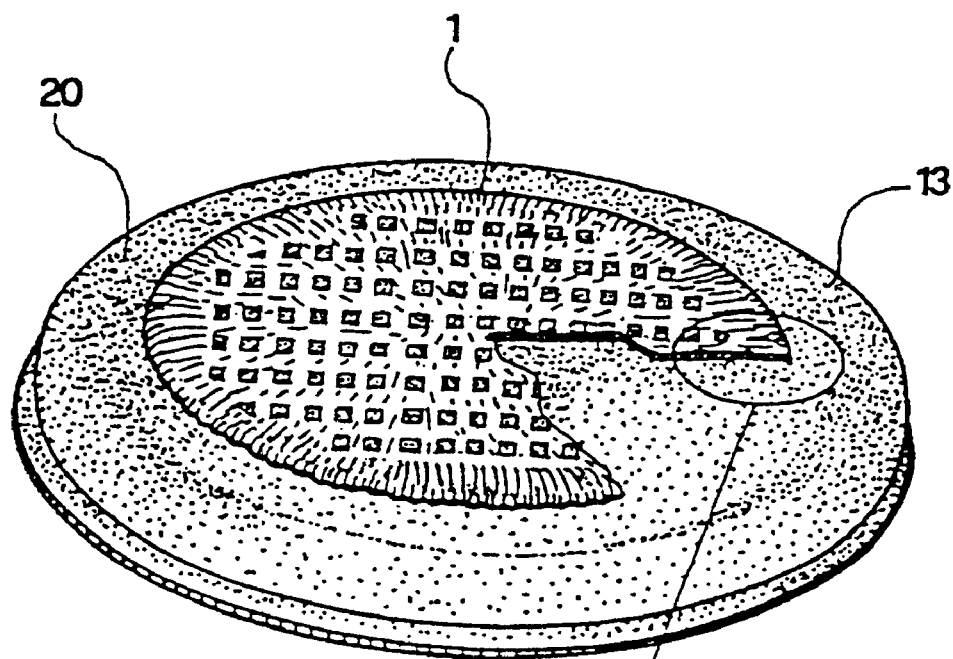
FIG. 10 shows a second semimanufactured vessel of an intermediate step of the process of the preceding figures.
Figure 11:
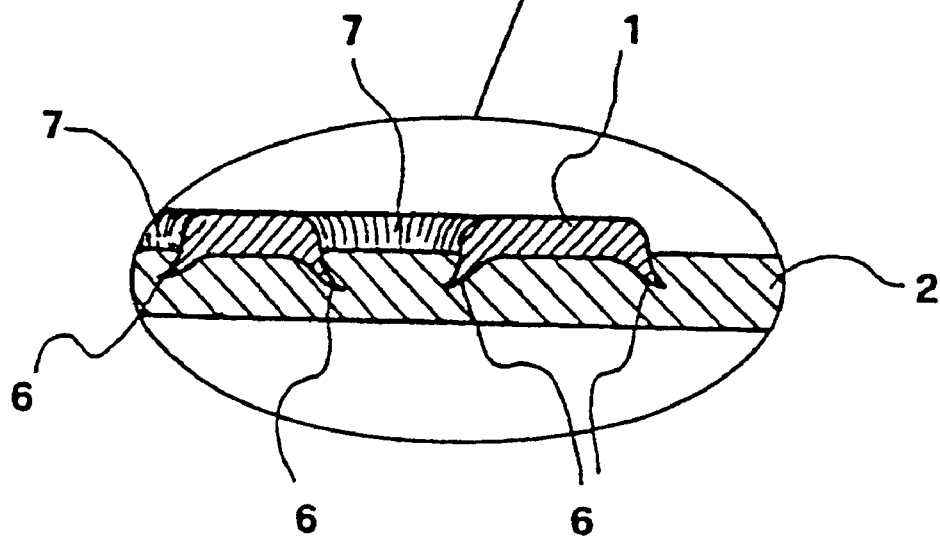
FIG. 11 shows an enlarged section of a detail of said second semimanufactured vessel.

The points 6 penetrate for the entire height thereof inside the thickness of the disc 2. The penetration, having been induced by compression, takes place in a substantially vertical way (FIGS. 8 and 9).

By virtue of the intimate connection between the disc 2 in a relatively soft material, and the plate member 1 in a harder material, a global reinforcement of the portion involved in the application of the plate member 1 is obtained.

Moreover, the penetration of a plurality of points 6 close among them, causes a localised work hardening of the softer material of the disc 2, which entails a stiffening of the disc 2 itself.

At this stage of the manufacturing process, although the penetration of the points 6 allows a stable connection, the latter is not optimal for the uses to which the cooking vessels can be destined.

Figure 6:
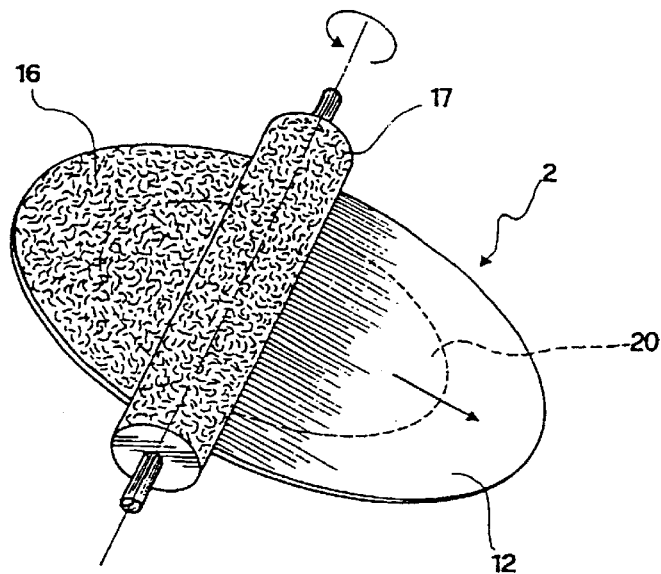

At the end of the above described press-stamping, the process according to the invention comprises a second step of depositing one or more inner coating layers 16 on said second surface 12 (FIG. 6).

The application of the inner layer 16 can be carried out according to one of the known methods: with a spray or a roller, or also through a silk-screen printing stencil, passing a sleeker to form specific patterns on the second surface 12.

According to a preferred but not exclusive method of the present embodiment, the inner layer 16 consists of a plurality of sublayers deposited in sequence with a roller application, indicated with 17 in FIG. 6.

In this case as well, such application method allows the forming of one or more outer coating layers 16 having a predetermined and controlled thickness, with the penetration of the innermost layer in said pores of the aluminium.

In a preferred embodiment of the present process, the inner coating layer 16 consists of non-stick polymeric materials.

The preferred polymeric material is a PTFE, in a dry weight percentage generally comprised in the range 30–75%, preferably in the range 40–60%.

The total applied thickness of the inner layer or layers 10 is comprised in the range 5–50 $\mu$m, preferably in the range 20–40 $\mu$m.

In any case, the inner layer 16 thus applied is capable of hiding, i.e. to make invisible, the impressions possibly left on said second surface 12 in the previous step of coining.

The inner layer or layers 16 thus applied to the disc 1 are then fixed by heating, entailing a polymerisation of the basic material.

When a smooth inner layer 10 is needed, such heating is performed by baking, at a temperature conveniently higher than 380° C., to obtain a suitable polymerisation, and lower than 480° C.

The preferred baking temperature interval range is 420–450° C.

In any case, the heating time is not longer than a few minutes and anyhow shorter than 10 minutes.

When instead a bottom surface provided with surface unevenness is desirable, such to divert the course and the cutting action of tools unwarily used onto said bottom surface, as cutlery, knives, beaters and the like, to adhere a second assembly of uneven inner layers to said inner layer 16 the latter has to be heated at a lower temperature, advantageously comprised in the 380–420° C. range.

Such heating causes a partial sintering of the non-stick material.

Then, said second assembly of uneven inner layers can be deposited on the fixed outer layer 16, e.g., by silk-screen stencil deposition that gives to said assembly a peculiar configuration, for instance in checkers, honeycomb or further comprising writings and/or ornamental patterns.

Such assembly can extend over a portion of the second surface 12 of the disc 1, preferably at the inner surface of the bottom of the vessel that is being formed.

The thickness of said assembly is comprised in a range from 5 to 50 $\mu$m, so as to create unevennesses of equal height. Preferably, the thickness of said assembly is comprised in a range from 20 to 45 $\mu$m.

Then, it is necessary for such assembly to be heated at a temperature higher than the heating temperature of the inner layer 10. Such difference is of at least 10° C., preferably of about 20° C.

The heating temperature of the assembly of the uneven inner layers is anyhow comprised in a range from 390° to 450° C., preferably in a range from 420° to 440° C.

Even in the case of said outer layer 10 and of said assembly, which are not shown, the baking time is anyhow limited to a few minutes, preferably shorter than 10 minutes.

Such heating causes a complete sintering of the inner layer 16 and of the assembly, entailing a suitable molecular integration therebetween.

Following said second step of depositing, the process according to the present embodiment comprises a forming step of shaping the disc 2.

In the process according to the present invention, such shaping is carried out with the performing of a step in which said flat member 2 undergoes a stretching, at least at the bottom portion 20 of the cooking vessel that is being manufactured.

Figure 7:
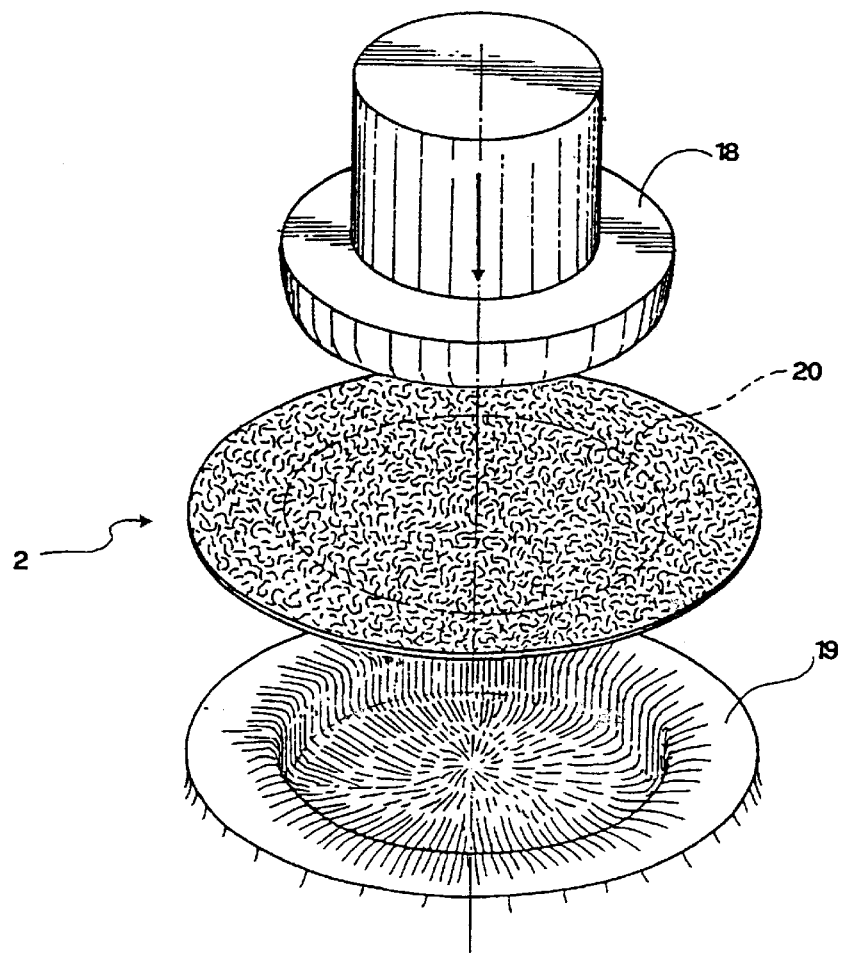

Such shaping takes place, in its most general aspect, at the press and in particular takes place by a drawing of substantially normal type, operated using a matrix 18 and a drawing punch 19 that cooperate with the aid of a pressure bar, not shown (FIG. 7).

Obviously, the drawing punch 19 operates on the second surface 12 of the disc 2 while the matrix 18 is put in contact with the first surface 11.

The drawing entails a radial stretching just at said bottom portion 20, the thickness thereof undergoes a stretching strain.

The drawing is advantageously of a simple type, implying only one pressing, regardless of the shape of the vessel to be produced.

In fact, with the above described process any kind of pot or pan can be manufactured: pans, saucepans and skillets having more or less high lateral walls, cylindrical or ellipsoidal sectioned pots, cake-tins, cup-formed or inverted frustoconical pots or saucepans, provided they have said bottom portion 20 substantially plane or anyhow convex to avoid bulgings deriving from thermal strain.

On said bottom portion 20 said plate member 1 is applied.

By virtue of the stretching of the thickness of the bottom portion the deformation of the points 6 inserted in the disc 1 is caused, causing in turn the clutching of the points 6 themselves inside said thickness.

Actually, for clutching a bending of the end of each point 6 is to be understood, detaching off the vertical according to which the points 6 were induced to penetrate in said thickness.

Thus, a possible dislocation of the plate member 1 along said vertical direction is finally prevented.

Further, such clutching makes the connection between the plate member 1 and the disc 2 firmer and it is capable to improve the reinforcing of the bottom portion 20 in comparison with the application processes of the known plate members, without causing to the materials thermal and/or mechanical trauma not substantially already envisaged by the usual manufacturing processes of the cooking vessels.

Once that the semimanufactured vessel has undergone said drawing, the vessel itself can at last be finished with the trimming of the rim of the vessel, possibly in a step concomitant to the turning, the addition of handles M, lids and other possible accessories.

Figure 12:
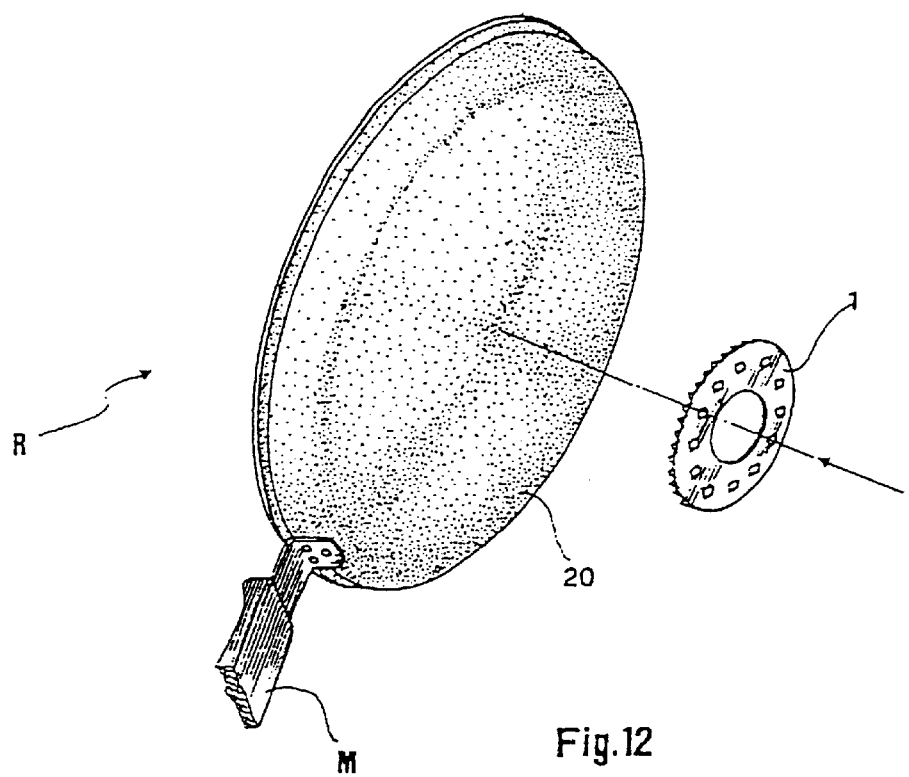
FIG. 12 shows a perspective and exploded view of a finished vessel obtained with said process.

Thus, a cooking vessel R (FIG. 12, 13) is manufactured, e.g., pan-shaped with only one projecting handle M, having a bottom portion 20 reinforced with a plate member 1.

The plate member 1 has a plurality of points 6, piece formed with said plate member nailed in said bottom portion 20 and bent inside the thickness thereof, performing a substantial clutching of the plate member 1 in said bottom portion 20.

Advantageously, said plate member 1 is placed on the outer surface of the cooking vessel R, in the area destined to be rested on any support.

Figure 13:
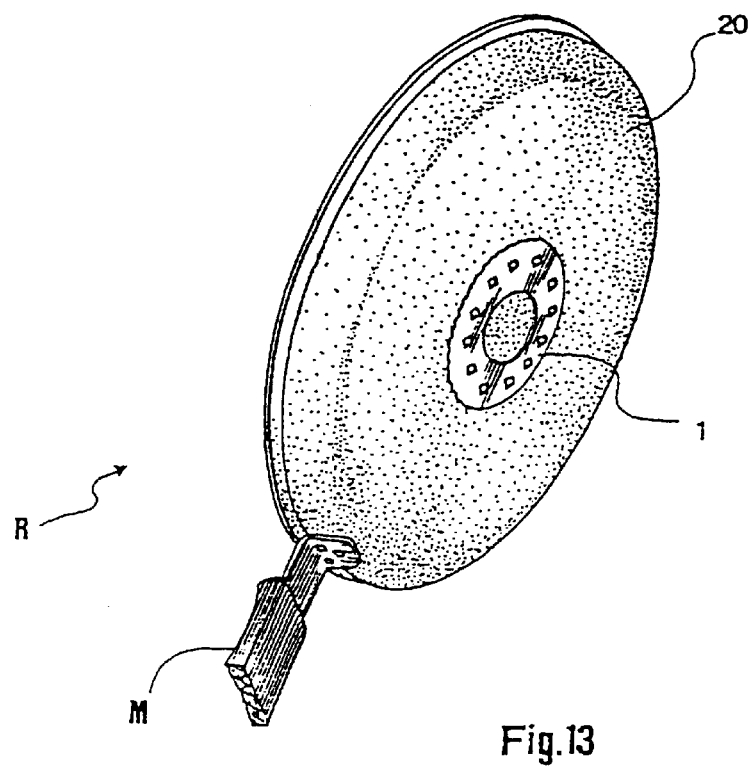
FIG. 13 shows a perspective view of the finished vessel of FIG. 12.

In FIG. 13 a pan is shown to which a plate member 1b is applied as shown in FIG. 2.

The vessel obtained with the process according to the invention has remarkable non-stick qualities both inside and outside, with long lasting non-stick layers.

Moreover, in the embodiment provided with an uneven inner bottom, an improved effectiveness against the damages deriving from a wrong use of the kitchen utensils is also provided.

To the above described process for the manufacture of cooking vessels with a reinforced bottom, a man skilled in the art, in order to satisfy further and contingent needs, may introduce several further modifications and variants, all of them comprised within the protection scope of the present invention, as defined in the annexed claims.

What is claimed is:

1. A process for the manufacture of cooking vessels, pots, and/or pans shaped starting from a flat member in a relatively soft metallic material and comprising a bottom portion comprising the following steps:
   providing a plate member, in a metallic material of relatively high hardness, provided with a plurality of points projecting from a surface thereof;
   inducing, by compression of the plate member on the flat member, the penetration of said points in the thickness of the flat member and the adhering of said surface of said plate member on a portions of the flat members at the bottom of the cooking vessel; and
   stretching said flat member at least at said bottom portions, causing the deformation and the clutching of said points inside said thickness.

2. The process according to claim 1, wherein said metallic material of relatively high hardness is a stainless steel.

3. The process according to claim 1, wherein said metallic material of relatively high hardness is apt to be heated by induction.

4. The process according to claim 3, wherein said metallic material of relatively high hardness is a ferritic stainless steel.

5. The process according to claim 4, wherein said ferritic stainless steel has a carbon content lower than 0.15% and a Chromium content higher than 15%.

6. The process according to claim 1, wherein said points are integrally formed with the plate member.

7. The process according to claim 6, wherein said points are formed by shearing and bending at an edge of the plate member.

8. The process according to claim 1, wherein said points are performed by punching of the plate member, using a punch having a drift-pin and provided with flat side faces jointed by sharp edges at the respective hole formed with said punching.

9. The process according to claim 1, wherein each point has an apex with a spread angle comprised in the range of 75° to 105°.

10. The process according to claim 1, wherein said points project in a substantially vertical way from said surface of the plate member.

11. The process according to claim 1, wherein said flat member is a disc.

12. The process according to claim 1, wherein said relatively soft metallic material is substantially aluminium-based.

13. The process according to claim 1, wherein said step of inducing, by compression of the plate member on the flat member, the penetration of said points in the thickness of the flat member and the adhering of said surface of said plate member on a portions of the flat member at the bottom of the cooking vessel, takes place by press-stamping of the plate member on a surface of the flat member.

14. The process according to claim 1, wherein said surface of the plate member is adhered on a first surface of the flat member apt to form the outer surface of the cooking vessel.

15. The process according to claim 1, wherein said step of inducing, by compression of the plate member on the flat member, the penetration of said points in the thickness of the flat member and the adhering of said surface of said plate member on a portion of flat member at the bottom of the cooking vessel, is preceded by a step of depositing of one or more outer coating layers on a first surface of the surfaces of said flat member.

16. The process according to claim 1, wherein said step of inducing, by compression of the plate member on the flat member, the penetration of said points in the thickness of the flat member and the adhering of said surface of said plate member on a portion of flat member at the bottom of the cooking vessel, is followed, prior to the subsequent step of stretching, by a step of depositing of one or more inner coating layers on a second surface of the surfaces of said flat member.

17. The process according to claim 16, wherein said flat member, prior to the steps of depositing of the coating layers, undergoes a step of superficial polishing treatment, with the removal of a possible oxidised layer.

18. The process according to claim 17, wherein said step of surface treatment is pickling.

19. The process according to claim 15, wherein the application of the outer layer takes place by means of a roller, exerting a predetermined application pressure on the first surface.

20. The process according to claim 15, wherein the outer coating layer consists of non-stick polymeric substances.

21. The process according to claim 20, wherein said non-stick polymeric substances are mixed with pigments.

22. The process according to claim 20, wherein said polymeric substances comprise PTFE, in a dry weight percentage comprised between 30% and 75%.

23. The process according to claim 15, wherein the total applied thickness of the outer layer is comprised in the range 5–50 μm.

24. The process according to claim 20, wherein the outer layer is fixed by heating at a temperature higher than 380° C. and lower than 480° C. for a heating time shorter than 10 minutes.

25. The process according to claim 16, wherein the inner layer consists of a plurality of sublayers deposited in sequence with a roller application, consists of non-stick polymeric substances, and is fixed by heating that is carried out by baking, at a temperature preferably comprised in the 380–420° C. range; and on which a second assembly of uneven inner layers having a thickness comprised in a range from 15 μm to 45 μm is deposited, fixed by heating at a temperature higher than the heating temperature of the inner layer of at least 10° C.

26. The process according to claim 1, wherein the step of stretching said flat member takes place by drawing.

27. The process according to claim 15, wherein said flat member, prior to the steps of depositing of the coating layers, undergoes a step of superficial polishing treatment, with the removal of a possible oxidised layer.

28. The process according to claim 27, wherein said step of surface treatment is pickling.

29. The process according to claim 15, wherein the total applied thickness of the outer layer is comprised in the range 15–40 μm.

30. The process according to claim 20, wherein the outer layer is fixed by heating at a temperature in the interval range 390–450° C. for a heating time shorter than 10 minutes.

31. The process according to claim 24, wherein heating is carried out by baking.

32. A cooking vessel comprising a bottom portion in a relatively soft material obtained through a stretching, reinforced by at least one plate member in a metallic material of relatively high hardness, wherein said at least one plate member has a plurality of points projecting from a surface thereof adhered to said bottom portion, said points being penetrated in the thickness of the bottom portion and bent inside said thickness according to said stretching, thereby performing a substantial clutching.

33. The cooking vessel according to claim 32, wherein said metallic material of relatively high hardness is a stainless steel.

34. The cooking vessel according to claim 32, wherein said metallic material of relatively high hardness is heatable by induction.

35. The cooking vessel according to claim 34, wherein said metallic material of relatively high hardness is a ferritic stainless steel.

36. The cooking vessel according to claim 35, wherein said ferritic stainless steel has a carbon content lower than 0.15% and a Chromium content higher than 15%.

37. The cooking vessel according to claim 32, wherein said points are integrally formed with the plate member.

38. The cooking vessel according to claim 32, wherein each points has an apex with a spread angle comprised in the range of 75° to 105°.

39. The cooking vessel according to claim 32, wherein said flat member is a disc.

40. The cooking vessel according to claim 32, wherein said relatively soft metallic material is substantially aluminium-based.

41. The cooking vessel according to claim 32, wherein the at least one plate member comprises a plurality of holes, each having respective points formed thereat.

* * * * *